United States Patent
Farr et al.

(10) Patent No.: US 10,995,749 B2
(45) Date of Patent: May 4, 2021

(54) METHOD FOR MONITORING THE VOLUMETRIC FLOW OF A METERING VALVE OF A FLUIDIC METERING SYSTEM OF AN INTERNAL COMBUSTION ENGINE, IN PARTICULAR OF A MOTOR VEHICLE

(71) Applicant: Robert Bosch GmbH, Stuttgart (DE)

(72) Inventors: Thomas Farr, Ludwigsburg (DE); Yihao Zhu, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 15/946,118

(22) Filed: Apr. 5, 2018

(65) Prior Publication Data

US 2018/0291889 A1  Oct. 11, 2018

(30) Foreign Application Priority Data

Apr. 5, 2017  (DE) .................. 10 2017 205 777.7

(51) Int. Cl.
*F04B 51/00* (2006.01)
*F01N 11/00* (2006.01)
(Continued)

(52) U.S. Cl.
CPC .............. *F04B 51/00* (2013.01); *F01N 11/00* (2013.01); *F04B 13/00* (2013.01); *F04B 49/065* (2013.01); *F01N 3/2066* (2013.01); *F01N 2550/05* (2013.01); *F01N 2610/02* (2013.01); *F01N 2610/1433* (2013.01);
(Continued)

(58) Field of Classification Search
CPC ........ F04B 51/00; F04B 13/00; F04B 49/065; F04B 2205/09; F04B 2201/0803; F04B 23/10; F04B 53/08; F01N 11/00; F01N 2610/1433; F01N 2900/1822; F01N 2610/1473; F01N 2900/1808; F01N 2550/05; F01N 3/2066; F01N 2610/02; F01N 2900/1806; F01N 9/00; F01N 3/208; F01N 2610/144; F01N 2610/1453; F01N 2610/1406; F01N 2900/04; F01N 2900/0408; F01N 2900/0422;
(Continued)

(56) References Cited

U.S. PATENT DOCUMENTS 7,930,116 B2 * 4/2011 Huebner ................. F01N 11/00
702/50
9,528,901 B2 * 12/2016 Kiesbauer ............... G01M 3/02
(Continued)

FOREIGN PATENT DOCUMENTS

CN       110608858 A   * 12/2019
DE       102013204686    9/2014

*Primary Examiner* — Nimeshkumar D Patel
*Assistant Examiner* — Gedeon M Kidanu
(74) *Attorney, Agent, or Firm* — Michael Best & Friedrich LLP

(57) ABSTRACT

A method for monitoring the volumetric flow of a metering valve (131) of a fluidic metering system (100) of an internal combustion engine, in which at least one feed pump (111) for feeding a fluid is arranged, the feed pump (111) being connected to a feed line (207) and to a return line (160), and it being provided in particular that an inner leakage of the feed pump (111) is determined and that the volumetric flow of the metering valve (131) is monitored on the basis of ascertained (320, 325) pressure values on the basis of the determined inner leakage of the feed pump (350).

10 Claims, 4 Drawing Sheets

(51) Int. Cl.
*F04B 49/06* (2006.01)
*F04B 13/00* (2006.01)
*F01N 3/20* (2006.01)

(52) U.S. Cl.
CPC ............... *F01N 2610/1473* (2013.01); *F01N 2900/1808* (2013.01); *F01N 2900/1822* (2013.01); *F04B 2201/0803* (2013.01); *F04B 2205/09* (2013.01)

(58) Field of Classification Search
CPC .... F04C 11/005; F04C 2/084; F04D 15/0088; F04F 5/10; F04F 5/54; F16K 49/005; Y02T 10/47
See application file for complete search history.

(56) References Cited

U.S. PATENT DOCUMENTS

| | | | | |
|---|---|---|---|---|
| 10,036,684 | B2* | 7/2018 | Kinoshita | G01M 3/2815 |
| 2001/0052338 | A1* | 12/2001 | Yates | F02D 33/006 |
| | | | | 123/506 |
| 2003/0121409 | A1* | 7/2003 | Lunzman | F15B 11/05 |
| | | | | 91/459 |
| 2003/0125840 | A1* | 7/2003 | Lunzman | G05D 7/0635 |
| | | | | 700/282 |
| 2006/0134811 | A1* | 6/2006 | Suzuki | H01L 21/67017 |
| | | | | 438/5 |
| 2009/0164094 | A1* | 6/2009 | Geveci | F02D 41/0087 |
| | | | | 701/103 |
| 2010/0278518 | A1* | 11/2010 | Gordon | F04D 15/0088 |
| | | | | 388/811 |
| 2018/0087425 | A1* | 3/2018 | Carr | F04C 2/084 |

* cited by examiner

METHOD FOR MONITORING THE VOLUMETRIC FLOW OF A METERING VALVE OF A FLUIDIC METERING SYSTEM OF AN INTERNAL COMBUSTION ENGINE, IN PARTICULAR OF A MOTOR VEHICLE

BACKGROUND OF THE INVENTION

The invention relates to a method for monitoring the volumetric flow of a metering valve of a fluidic metering system, in particular a DNOX metering system of an internal combustion engine of a motor vehicle, in which at least one feed pump for feeding a fluid is arranged. The invention also relates to a computer program, to a machine-readable data medium for storing the computer program and to an electronic control device, by means of which the method according to the invention can be carried out.

To restrict pollutant emissions of motor vehicles, around the world the permissible limit values are increasingly being lowered. At present, the amended emission legislation (for example Euro 6) and new test cycles (WLTP: Worldwide Harmonized Light Duty Test Procedure or RDE: Real Driving Emission, expected from 2017) are reducing these permissible values still further. For all vehicle classes, compliance with these limit values will only be possible with active exhaust treatment.

The Denoxtronic (DNOX) of an SCR (Selective Catalytic Reduction) metering system for exhaust treatment is used for injecting so-called "AdBlue", a urea-water solution (UWS) of 32.5% urea in water, into the exhaust gas flow upstream of an SCR catalyst. The urea is converted into ammonia by thermolysis and hydrolysis. In the SCR catalyst, the ammonia reduces the nitrogen oxides to water and nitrogen.

In modern diesel engines with an SCR exhaust treatment, raw NOx emissions are reduced by means of a said DNOX system by up to 95%. Future DNOX systems will comprise a volumetric feed pump and be operated in a purely open-loop controlled manner. These systems have a return for unused AdBlue solution into the UWS storage tank. The feed pump is usually a positive displacement pump, for example a reciprocating pump, in the case of which the volumetric flow of the feed pump can be determined relatively easily if the swept volume is known.

Said DNOX systems must meet statutory requirements with regard to on-board diagnostics ("OBD") and a warning and request system. This includes that the volumetric flow through the metering valve must be monitored with regard to two system properties, to be specific the capability of supplying UWS (the so-called "reductant delivery performance") and the consumption of UWS (the so-called "consumption deviation"). In the case of these systems, the volumetric flow through the monitoring valve can be monitored on the basis of the volumetric flow through the return that is typically formed by an orifice plate.

A method and a device for determining inadmissible deviations in the metering quantities of an SCR catalyst are disclosed by DE 10 2013 204 686 A1. A possible quantity deviation is assessed on the basis of the data signals recorded by these two different measurement or signal sources. For a predetermined time interval, a metering valve is opened and the resultant pressure drop is measured. The recorded pressure drop is compared with a predetermined threshold value and the value for the quantity deviation is determined from the result of the comparison.

DISCLOSURE OF THE INVENTION

The invention is based on the idea of monitoring the volumetric flow or the injection quantity of a metering valve provided for the metering of a fluid in the case of a metering system with a feed pump concerned here, while taking into consideration an inner or internal leakage of the feed pump. In particular, the invention thereby relates to a DNOX metering system with a feed pump formed as a positive displacement pump and also with a return for fluid already fed in. It is also based on the recognition that quantity deviations in the metering of the fluid can occur as a result of an internal leakage of the feed pump.

The said metering systems known per se have only a very limited possibility of determining or detecting such quantity deviations. This requires very precise production of individual system components and/or complex calculations of further variables, for example the hydraulic or mechanical system stiffness of the metering system. An additional disadvantage in the case of these calculations is that the results of the system stiffness are influenced considerably by the internal leakage of the feed pump. In addition, the size of the internal leakage changes over the lifetime of the pump.

The concepts known in the prior art for monitoring the volumetric flow of a metering valve concerned here therefore depend on the inner leakage of the feed pump being negligible. However, there has so far been no concept that takes an existing inner leakage into consideration in the monitoring.

In the case of the proposed method for monitoring the volumetric flow of a metering valve of a metering system concerned here of an internal combustion engine, in the case of which at least one feed pump for feeding a fluid is arranged, the feed pump being connected to a feed line and to a return line, it is provided in particular that an inner leakage of the feed pump is determined and that the volumetric flow of the metering valve is monitored on the basis of experimentally ascertained pressure values on the basis of the determined inner leakage of the feed pump. The pressure drop or the pressure rate between an inlet and an outlet of the feed pump may be ascertained experimentally as pressure values.

With the proposed procedure for the analytical determination of the inner leakage, the feed pump is notionally broken down into individual components, to be precise a volumetric pump and an ideal throttle arranged parallel to the feed pump. Such a breakdown applies with good approximation to positive displacement pumps substantially concerned here, such as for example reciprocating pumps or gear pumps. The throttle is also notionally displaced in such a way that it is arranged parallel to the return at the outlet of the feed pump. This displacement is only permissible if the pressure difference $(p_A-p_R)$ in comparison with the fluidic system pressure p can be ignored.

The volumetric flow of fluid through the metering valve is preferably determined on the basis of experimental measurements of the pressure rate or the pressure drop. This also allows quantity deviations or incorrect meterings of the metering system to be detected very precisely and controlled or eliminated. Precise values of the volumetric flow can be calculated on the basis of the following equation:

$$Q_{MV}=(\lambda_{BF\&MV}/\lambda_{BF}-1)*(Q_{IL}+Q_{BF}),$$

in which Q denotes the volumetric flow of fluid, $\lambda$ denotes the pressure rate, and the indices BF=return, MV=metering valve and IR=leakage denote the corresponding components of the volumetric flow, the overall volumetric flow remaining the same.

In the experimental measurement, the volumetric pump can be operated at a predeterminable or defined speed, and consequently delivers a volumetric flow that is known per se. It should be noted here that the monitoring of the volumetric flow through the metering valve requires a defined volumetric flow of the return. For this purpose, an orifice plate is used. Since the inner leakage of the feed pump influences the volumetric flow of the return, the leakage can be recorded and taken into consideration. The monitoring of the volumetric flow through the metering valve can consequently be performed on the basis of experimentally ascertained pressure rates or pressure values, to be precise on the basis of the volumetric flow through the return and taking into consideration a predetermined inner leakage of the feed pump.

The volumetric flow through a said orifice plate can be calculated with the aid of the density of the liquid and the measured pressure. The throttle and the orifice plate can in this case be arranged parallel to one another in conducting terms. The density of the liquid is ascertained from its measured temperature. To be able to calculate the volumetric flow of the leakage from the measured pressure, a constant α is required, which can be calculated from the measured temperature and the measured pressure. Consequently, the volumetric flow of the leakage can also be determined for each measured value of the pressure.

The proposed method makes it possible to monitor or even improve the monitoring of the volumetric flow through the metering valve in the case of an existing metering system with an inner leakage. Since, with the method, the inner leakage is taken into consideration in the monitoring of the volumetric flow of the metering valve, it is also made possible for (feed) pumps without shut-off elements, for example diaphragm or valve pumps, to be used. Moreover, pumps which can both feed and return in an easy way by reversing the running direction can also be used. In this way, systems with a relatively great feed rate or feed capacity can be realized at low cost.

Since the proposed approach for recording the inner leakage is based exclusively on known properties, and consequently existing variables of components of the feed pump, it can be realized without appreciable additional costs. In particular, all that is required is a modified control program, but no additional electronic or hydraulic device or apparatus.

By means of the proposed method, it is also advantageously possible to minimize the impact on the operation of the pump of the negative effects of production tolerances of a feed pump concerned here with internal leakage. As a result, the production costs of a feed pump can consequently also be reduced considerably. Since moreover the swept volume of a feed pump that is fitted in the metering system as a fixed installation is precisely known as a function of the fluidic pressure in the metering system, considerably smaller metering quantity deviations of the fluidic substance to be metered concerned here can be realized in comparison with the prior art.

The invention can be used in all fluidic hydraulic metering systems, in particular in the case of know SCR exhaust treatment systems. A preferred area of use is that of future "Denoxtronic" metering systems of the applicant, which are to be used both in passenger cars and commercial motor vehicles and which have the feed pump concerned here, preferably formed as a positive displacement pump, for a fluid to be metered.

The computer program according to the invention is designed to carry out each step of the method, in particular if it runs on a computer or a control device. It makes it possible for the method according to the invention to be implemented on an electronic control device without structural modifications having to be performed on it. Provided for this purpose is the machine-readable data medium, on which the computer program according to the invention is stored. By transferring the computer program according to the invention onto an electronic control device, the electronic control device according to the invention is obtained, designed to control a fluidic metering system concerned here by means of the method according to the invention.

Further advantages and refinements of the invention emerge from the description and the accompanying drawings.

It goes without saying that the features mentioned above and those still to be explained below can be used not only in the respectively specified combination but also in other combinations or on their own without departing from the scope of the present invention.

DETAILED DESCRIPTION

The enhanced quantity deviation detection described below for DNOX systems can be used in particular in the case of positive displacement pumps with internal leakage and external return, for example in the case of so-called "COR" pumps.

Figure 1:
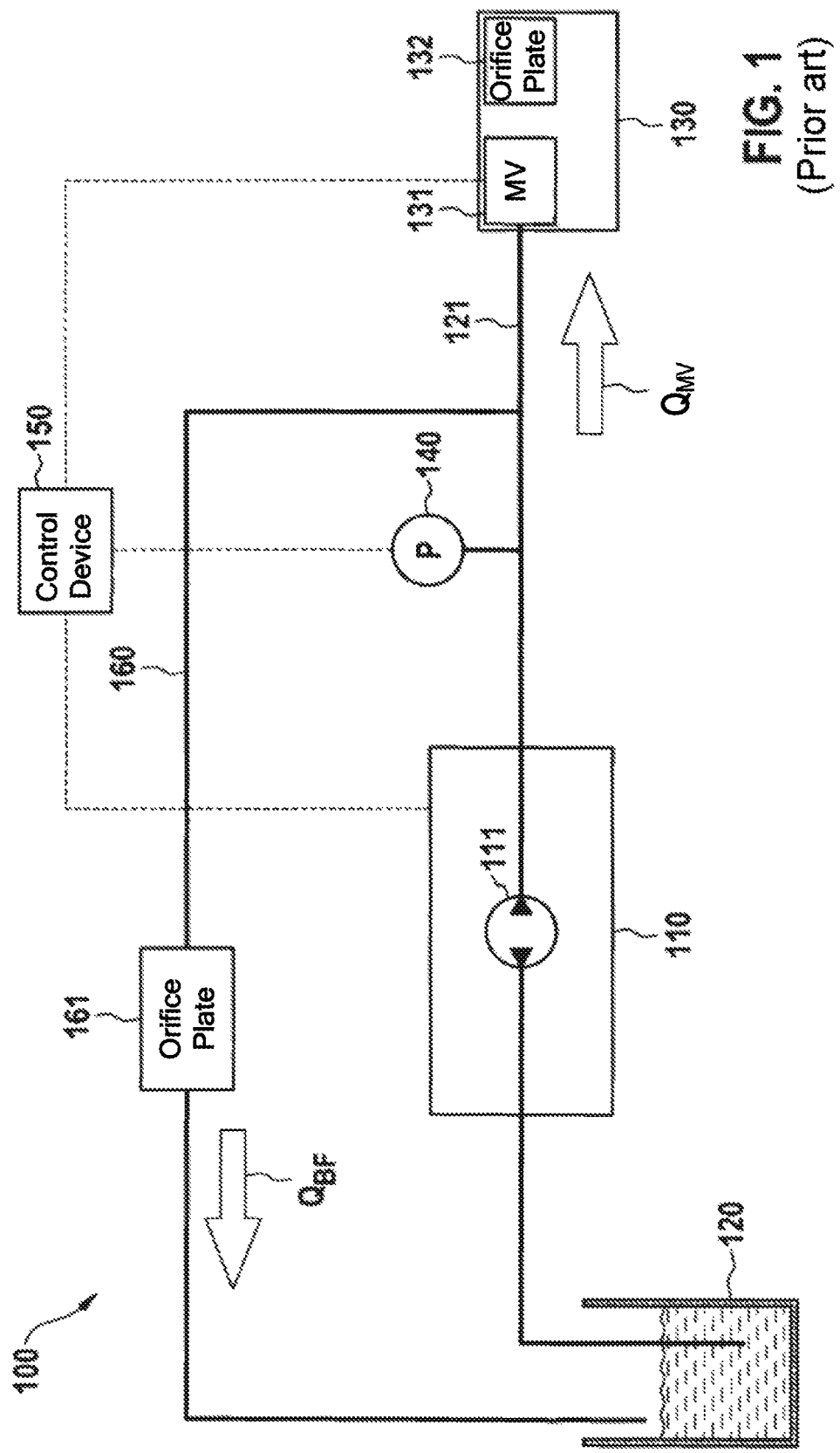
FIG. 1 shows a block diagram of a UWS metering system of an SCR catalyst according to the prior art.

As schematically represented in FIG. 1 by the example of an SCR catalyst, metering systems equipped with feed units and injectors are used for the exhaust treatment of internal combustion engines by means of "AdBlue" or UWS metering into the exhaust flow. In many cases, a return to an AdBlue storage tank is in this case also provided. To ensure operation of these systems that conforms to laws on emissions, the amount of AdBlue that is metered into the exhaust branch must be monitored.

The fluidic metering system 100 of a motor vehicle that is known per se and shown in FIG. 1 comprises a feed module 110, which has a rotating feed pump 111, which is designed to feed UWS fluid (or reducing agent) from a UWS storage tank 120 by way of a pressure line 121 into the metering module 130, where the UWS fluid is then injected into an exhaust branch that is not shown. In addition, the metering module 130 comprises a metering valve 131, which may be open or closed and controls the volumetric flow of UWS fluid to the metering module 130, and an orifice plate 132, which changes the volumetric flow $Q_{MV}$ of the USW fluid through the metering module 130. A pressure sensor 140 is also arranged in the metering system 100 and designed to measure a pressure p between the feed module 110 and the metering module 130 over a time period. An electronic control device 150 is connected to the pressure sensor 140 and receives from it information concerning the pressure in the system 100. In addition, the electronic control device 150 is connected to the feed module, including the feed pump 111, and also to the metering module 130, together with the metering valve 131, and can control them.

In addition, the metering system 100 comprises a return (or a return line) 160, through which UWS fluid is returned from the system into the UWS storage tank 120 with a volumetric flow $Q_{BF}$. Arranged in this return 160 is an orifice plate 161, which offers a local flow resistance and to do so reduces the size of an effective cross-sectional area of the return 160.

For the official or technical approval of future metering systems, quantity deviations of 35% must be detected by means of a so-called "Consumption Deviation Monitoring". Systems known per se only sometimes have the possibility of detecting this quantity deviation and require the very precise production of individual system components and/or the complete calculation of further variables, for example the stiffness determination. The stiffness determination that is applied at present in a system with a COR pump results in a dependence of the result on the internal leakage of the COR pump. Reduction and confinement of the internal leakage is not possible with the current state of knowledge, since it can change greatly over the lifetime of the pump.

Figure 2A:
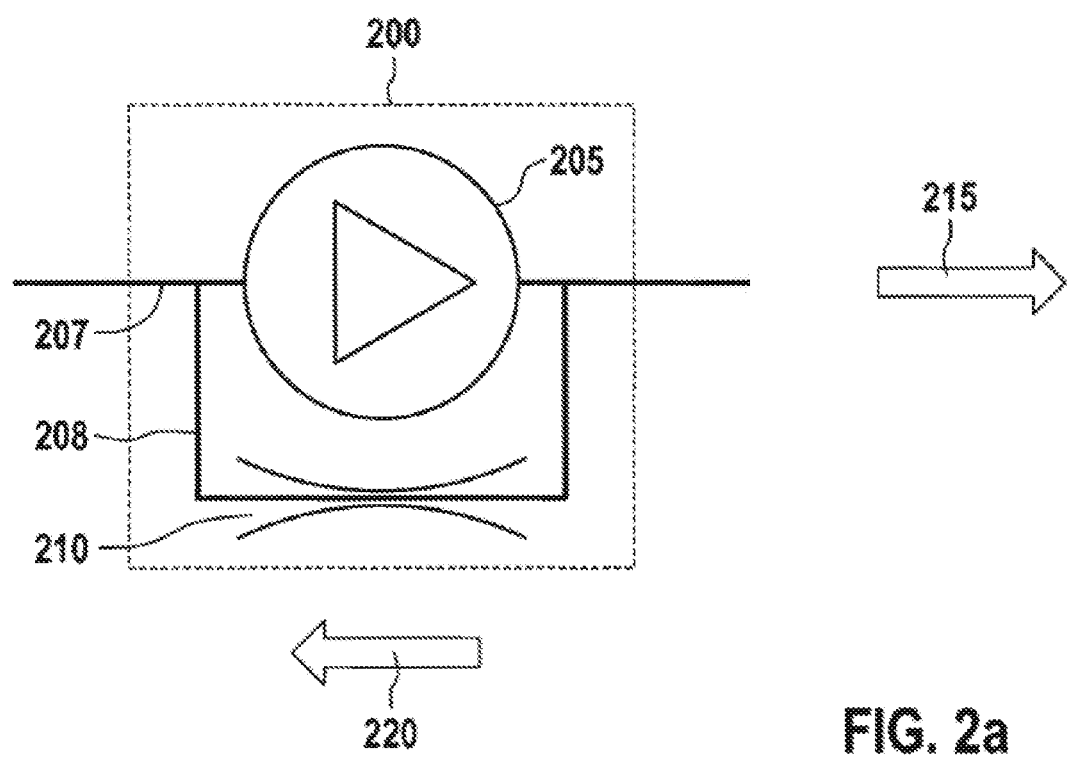
FIGS. 2a and 2b show a notional breakdown according to the invention of a feed pump concerned here into individual components.
Figure 2B:
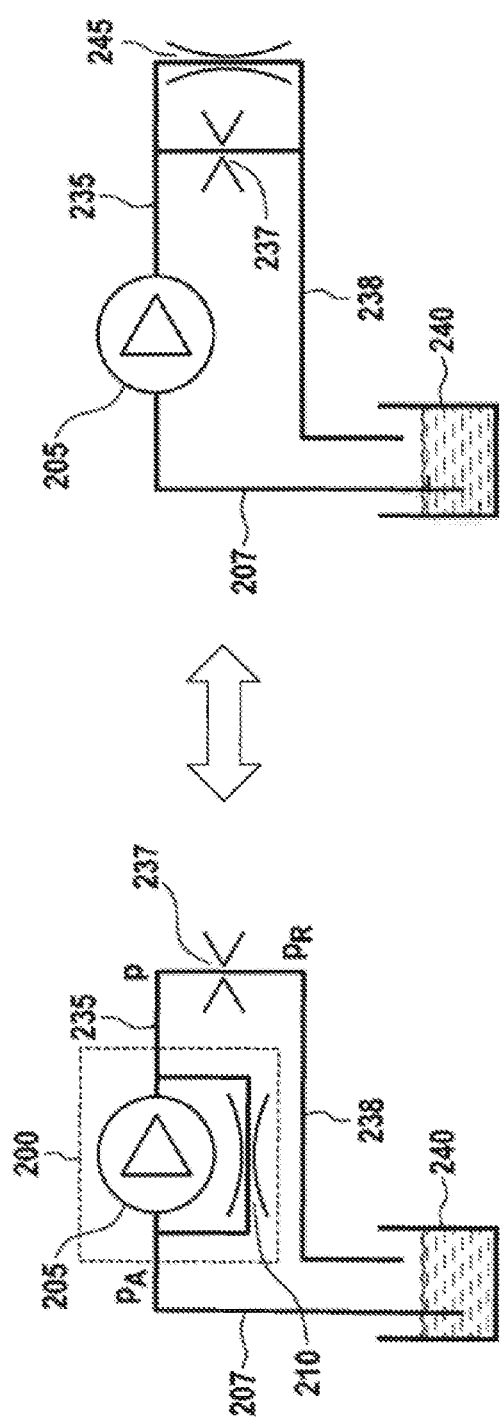

Described below on the basis of FIGS. 2a and 2b are the notional breakdown of a feed pump concerned here into individual components (FIG. 2a) and also the notional displacement (FIG. 2b) of the throttle responsible for the inner leakage. Such a displacement is permissible whenever the pressure difference $(p_A-p_R)$ according to FIG. 2b between the intake line and the return line of the pump in comparison with the overall pressure p of the metering system can be ignored.

A schematically represented feed pump, delimited in FIG. 2a by the dashed line 200, comprises a volumetric pump 205, which is connected to a feed line 207. In a branching line 208 running parallel to the volumetric pump 205, an ideal throttle 210 is arranged as a component of the feed pump 200. In the first direction of an arrow 215, the feed flow produced by the volumetric pump 205 takes place, whereas the return flow illustrated by the inner leakage of the feed pump 200 by means of throttle 210 takes place in a second direction of an arrow 220.

In FIG. 2b, the feed pump 200 is again represented with the two components 205, 210 that are shown in FIG. 2a. As can be seen from the left part of the image, the feed pump 200 is in turn connected to the feed line 207 shown in FIG. 2a, while a liquid pressure $P_A$ is present at the pump inlet. At the outlet of the feed pump 200, the pressure p is present at a discharge line 235. Outside the feed pump 200, an orifice plate 237 that is effective in a way known per se for the return of fluid by way of the return line 238 is arranged at the pump outlet. The feed line 207 and the discharge line 235 or the return line 238 end in a storage tank 240 for the respective fluid. As can be seen from the right part of the image in FIG. 2b, the notional displacement of the throttle 245 that is responsible for the inner leakage takes place in such a way that the throttle 245 and the orifice plates 237 are arranged parallel to one another in conducting terms, so that the inner leakage is effective as an additional return path with respect to the orifice 237.

In the following, the leakage volumetric flow in particular of a positive displacement pump is analytically derived. It is assumed here that, with a given temperature, the viscosity of the fluid is constant, and therefore the volumetric flow up to a critical rotational speed speed is proportional to the speed. However, the pressure at the outlet of the pump must not become too great, in order that no deformations of the pump geometry occur.

For a volumetric pump assumed here, the following equation (1) applies for the relationship between the volumetric flow $Q_{vol.pump}$ and the rotational speed n:

$$Q_{vol.pump}=Q_{max}*(n/n_{max}) \quad (1).$$

The following relationship applies for the volumetric flow $Q_{orifice}$ through an orifice plate 237 that is shown in FIG. 2b:

$$Q_{orifice}=\sqrt{(\rho_{nom}/\rho)}*Q_{nom}*\sqrt{(p/p_{nom})} \quad (2),$$

where $\rho$, the density of the fluid flowing through the orifice plate 237, depends on the temperature of the fluid according to the relation $\rho=f(T)$. The value $\rho_{nom}$ in this case represents a nominal value of the density and $p_{nom}$ represents a nominal value of the pressure.

For the inner leakage of the positive displacement pump, the following volumetric flow $Q_{leakage}$, dependent on the pressure p, is obtained:

$$Q_{leakage}=\alpha*p \quad (3),$$

where the constant $\alpha$ is known per se, but can be determined from other variables as follows.

For the volumetric flow $Q_{vol.pump}$ resulting overall, i.e. on balance, of the assumed, volumetric pump, it then follows that:

$$Q_{vol.pump}=Q_{orifice}+Q_{leakage} \quad (4).$$

Consequently, by simple rearrangement, the following is obtained from the said equations (1) to (4) for the constant $\alpha$:

$$\alpha=Q_{max}/p*n/n_{max}-\sqrt{(\rho_{nom}/f(T))}*Q_{nom}*1/(\sqrt{(\rho_{nom}*p)}) \quad (5).$$

Taking into consideration the internal leakage, the following is also obtained for the pressure rate $\lambda(t)$:

$$\lambda(t) = dp(t)/dt = 1/V*dp(t)/(dV(t)/V)*dV(t)/dt \quad (6)$$
$$= 1/V*dp(t)/(dV(t)/V)*Q(t),$$

where the variable V corresponds to the pump volume of the positive displacement pump. Since, furthermore, the stiffness k of the positive displacement pump is given by the following relation $$k=dp(t)/(dV(t)/V) \quad (7),$$

the following is obtained overall for the pressure rate $\lambda(t)$:

$$\lambda(t)=k/V*Q(t) \quad (8).$$

On the further assumption that the said volume V is constant, with relatively short measuring times t the value of the stiffness k according to equation (7) substantially depends only on the pressure p.

Consequently, the pressure rate $\lambda$ for the two situations, metering valve "open" and "closed", can be calculated as follows:

a) metering valve "closed":

$$\lambda_{BF}=k/V*(Q_{IL}+Q_{BF}) \quad (9)$$

and b) metering valve "open":

$$\lambda_{BF\&MV}=k/V*(Q_{IL}+Q_{BF}+Q_{MV}) \quad (10),$$

where the indices BF=return, MV=metering valve and IL=leakage denote the corresponding individual volumetric flows or components of the volumetric flow.

Altogether, the following ratio of the said pressure rates is obtained on the basis of the individual volumetric flows:

$$\lambda_{BF\&MV}/\lambda_{BF}=(Q_{IL}+Q_{BF}+Q_{MV})/(Q_{IL}+Q_{BF}) \quad (11)$$

and consequently for the volumetric flow $Q_{DV}$ through the metering valve:

$$Q_{MV}=(\lambda_{BF\&MV}/\lambda_{BF}-1)*(Q_{IL}+Q_{BF}) \quad (12)$$

In the experimental measurements to be carried out, the volumetric pump is operated with a defined rotational speed, and consequently delivers a known volumetric flow. The volumetric flow through the orifice plate 237 is calculated with the aid of the density of the liquid and the measured pressure. The density of the liquid is ascertained from its measured temperature. The parameter α is missing, in order to be able to calculate the volumetric flow of the leakage from the measured pressure. The aim is to obtain the volumetric flows. The sought parameter α can be calculated from the measured temperature and the measured pressure. Consequently, the volumetric flow of the leakage can also be determined for each measured value of the pressure.

The described method for determining the inner leakage is based on the assumption that this leakage behaves like a throttle. If the leakage displays different behavior, this can be approximated by a piecewise linear function: $Q_{IL}=k*p+Q_0$. For the determination of the two parameters k and $Q_0$, altogether two measurements are required. With x successive pieces, consequently x+1 measurements are obtained.

The validity of the parameter α can be verified by one or more measurements in quick succession at different rotational speeds. The determination of the inner leakage may also be used for monitoring an outer leakage. If the value of the inner leakage ascertained exceeds a threshold, it is assumed that there is an additional outer leakage.

Figure 3:
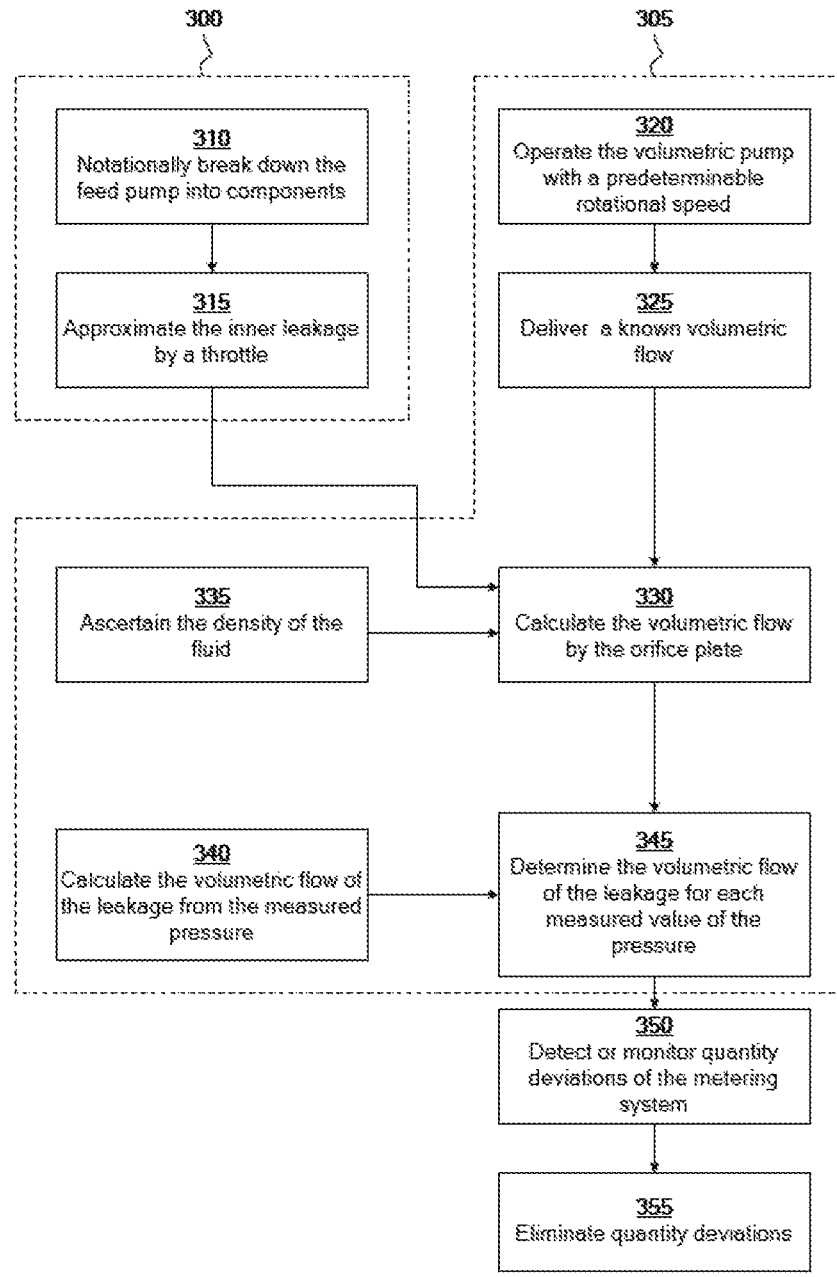
FIG. 3 shows an exemplary embodiment of the method according to the invention on the basis of a flow diagram.

In FIG. 3, an exemplary embodiment of the method according to the invention is shown. In the present exemplary embodiment, the method is made up of two part-methods that are delimited by dashed lines 300, 305 and are carried out at successive times or at the same time. In the first part-method 300, an analytical determination of the inner leakage of the feed pump concerned here is carried out. As described, the feed pump is in this case notionally broken down into components 310. Such a breakdown applies with good approximation for pumps operating on the displacement principle. The inner leakage is approximated by a throttle 315, which is arranged parallel to an orifice plate already provided for the return.

The volumetric flow through the metering valve is determined on the basis of experimental measurements of the pressure rate or the pressure drop carried out in the second part-method 305. The volumetric pump is in this case operated with a predeterminable rotational speed 320, and consequently delivers a volumetric flow 325 known per se. The volumetric flow calculated by the orifice plate with the aid of the density of the fluid that is known per se and the measured pressure 330. The density of the fluid is ascertained in the example in a known way from the measured fluid temperature 335. To be able to calculate the volumetric flow of the leakage from the measured pressure, the previously described constant α is required, which in the exemplary embodiment is calculated from the measured temperature and the measured pressure 340. Consequently, the volumetric flow of the leakage is determined for each measured value of the pressure 345.

On the basis of these measurement results, possible quantity deviations of the metering system can be detected or monitored on the basis of the ascertained volumetric flow 350. The quantity deviations thus detected can then be eliminated by measures known per se 355.

The described method may be realized in the form of a control program for an electronic control device for controlling an internal combustion engine or in the form of one or more corresponding electronic control units (ECUs).

The invention claimed is:

1. A method for monitoring a volumetric flow of a metering valve (131) of a fluidic metering system (100) of an internal combustion engine, the system having at least one feed pump (111) for feeding a fluid, the feed pump (111) being connected to a feed line (207) and to a return line (160), the method comprising:
   determining an inner leakage of the feed pump (111);
   experimentally ascertaining pressure values based on the determined inner leakage of the feed pump (111); and
   monitoring the volumetric flow of the metering valve (131) based on the experimentally ascertained pressure values.

2. The method of claim 1, wherein experimentally ascertaining the pressure values comprises experimentally ascertaining a pressure drop or a pressure rate between an inlet (207) and an outlet (235) of the feed pump (111).

3. The method of claim 2, wherein determining the inner leakage of the feed pump (111, 200) comprises analytically determining the inner leakage of the feed pump (111, 200) by breaking down the feed pump (111, 200) into a volumetric pump (205) and a throttle (210) arranged parallel to the volumetric pump (205).

4. The method of claim 3, wherein experimentally ascertaining the pressure values also comprises operating the volumetric pump (205) with a predeterminable rotational speed.

5. The method of claim 3, wherein monitoring the volumetric flow of the metering valve also comprises analytically determining volumetric flow $Q_{MV}$ through the metering valve (131) on the basis of the following equation:

$$Q_{MV}=(\lambda_{BF\&MV}/\lambda_{BF}-1)*(Q_{IL}+Q_{BF}),$$

in which Q denotes the volumetric flow of fluid, λ denotes the pressure rate, and the indices BF=return, MV=metering valve and IR=leakage denote the corresponding components of the volumetric flow.

6. The method of claim 3, wherein determining the inner leakage of the feed pump (111, 100) also comprises arranging an orifice plate (161, 237) effective for return of fluid into a storage tank (120, 240) at the outlet of the feed pump (111, 200).

7. The method of claim 6, wherein determining the inner leakage of the feed pump (111, 100) also comprises arranging the throttle (245) and the orifice plate (161, 237) parallel to one another in conducting terms.

8. The method of claim 6, wherein monitoring the volumetric flow of the metering valve also comprises calculating volumetric flow through the orifice plate (161, 237) on the basis of the density of the fluid and the experimentally ascertained pressure.

9. A non-transitory, computer-readable medium containing instructions that when executed by a computer cause the computer to control a fluidic metering system (100) of an internal combustion engine, the system having at least one feed pump (111) for feeding a fluid, and to:
   determine an inner leakage of the feed pump (111),
   ascertain pressure values based on the determined inner leakage of the feed pump (111), and
   monitor the volumetric flow of the metering valve (131) based on the ascertained pressure values.

10. An electronic controlled device (150), which is configured to control a fluidic metering system, in which at least one feed pump (111) for feeding a fluid is arranged and in which the feed pump (111) is connected to a feed line (207) and to a return line (160), on the basis of the method of claim 1.

\* \* \* \* \*